United States Patent [19]

Kishi et al.

[11] Patent Number: 4,607,327

[45] Date of Patent: Aug. 19, 1986

[54] MODULAR NUMERICAL CONTROL SYSTEM WITH AUTOMATIC PROGRAMMING FUNCTION

[75] Inventors: Hajimu Kishi; Mitsuo Kurakake, both of Hino; Masaki Seki, Takaidonishi; Kunio Tanaka, Akishima; Teruyuki Matsumura, Hachioji, all of Japan

[73] Assignee: Fanuc Ltd., Minamitsuru, Japan

[21] Appl. No.: 536,879

[22] Filed: Sep. 29, 1983

[30] Foreign Application Priority Data

Sep. 29, 1982 [JP] Japan ............................. 57-170673

[51] Int. Cl.⁴ .................... G06F 15/46; G05B 19/18
[52] U.S. Cl. ................................. 364/191; 364/167; 364/171; 364/180; 364/188; 318/569
[58] Field of Search ............... 364/167, 171, 180–181, 364/188–189, 191–194; 318/567–569, 590, 600; 340/825.06, 825.07, 825.22, 825.23

[56] References Cited

U.S. PATENT DOCUMENTS

| | | |
|---|---|---|
| 3,668,379 | 6/1972 | Roberts et al. ............... 364/180 X |
| 3,878,983 | 4/1975 | Hamill, III et al. ........... 364/193 X |
| 3,970,830 | 7/1976 | White et al. .................. 318/567 X |
| 4,059,745 | 11/1977 | Gaertner ........................ 364/180 X |
| 4,140,953 | 2/1979 | Dunne ............................... 318/568 |
| 4,314,330 | 2/1982 | Slawson ........................... 364/192 |
| 4,433,373 | 2/1984 | Miller .............................. 364/171 |
| 4,435,771 | 3/1984 | Nozawa et al. ................ 318/569 X |

Primary Examiner—Gary V. Harkcom
Attorney, Agent, or Firm—Staas & Halsey

[57] ABSTRACT

A numerical control system having an automatic programming unit for executing automatic programming, and a numerical control unit for executing numerical control. A single operator's panel having selection keys is provided and shared by both the automatic programming unit and numerical control unit. The system includes a control unit which, based on selection information entered from the operator's panel by manipution of the selection keys, devotes the operator's panel exclusively to the automatic programming unit or numerical control unit. The automatic programming unit and numerical control unit share a single display device and a single data input/output unit, in addition to the operator's panel.

14 Claims, 12 Drawing Figures

Fig. 4

\* Port Contour \*

| Code No | Shape Element |
|---|---|
| 001 : | ↑ → ↑ → C ↓ R ↓ → ↓ |
| 002 : | ↑ → ↑ → R ↓ → R → ↓ → ↓ |
| 003 : | ↑ → ↑ → ↑ → ↑ ← ↑ → C ↓ |
| 004 : | → ⌒ ↗ ⌒ |
| 005 :· |  |
| 006 :· |  |

001 = ↑ → ↑ → C ↓ R → ↓

Contour = 001

D = 40

L = 90

MODULAR NUMERICAL CONTROL SYSTEM WITH AUTOMATIC PROGRAMMING FUNCTION

BACKGROUND OF THE INVENTION

This invention relates to a numerical control system and, more particularly, to a numerical control apparatus having an automatic programming function.

When constructing a new system, it is possible to build up the system, which has all the necessary functions, in the form of a single, large unit. However, a more preferred approach is to separate the functions into individual modules, design each module independently and then interconnect the modules to form the desired system. The latter technique constructs the system at lower cost, provides higher reliability, requires less labor for development and facilitates maintenance.

This preferred technique of system construction is applicable to the development of a numerical control (NC) system having both an automatic programming function and NC function. Conventionally, however, such NC systems are developed not by adopting the modular approach but by merely adding a high-speed automatic programming function to an NC apparatus, thus giving rise to problems related to processing speed and memory capacity. As a result, a separate processor not involved with the NC control operation must be provided as well as a greater memory capacity, and the system architecture itself must be redesigned. Moreover, the conventional NC apparatus equipped with an automatic programming function must be specially designed for the particular machine tool, such as a lathe, milling machine, machining center or wire-cut electric discharge machine, or whenever a device is requested with unique specifications. This involves major problems in the areas of design and maintenance.

Therefore, according to the present invention, a desired system is built up by dividing an automatically programmable NC apparatus into a number of modules for (a) an automatic programming function, (b) an NC function, (c) a display function, (d) a data input/output function, and (e) manual operation function. The system is designed module by module, and the modules are appropriately combined to construct the final system.

In order to provide a single system with an NC automatic programming function and an NC function, it is required that an operator's panel, display device (CRT) and data input/output unit be furnished for each function. To this end, merely adopting the modular approach would require the provision of two operator's panels, two display devices and two input/output units, with attendant disadvantages of high cost and greater size

SUMMARY OF THE INVENTION

Accordingly, the object of the present invention is to provide an automatically programmable NC apparatus of reduced cost and excellent system efficiency, without a significant increase in the size of the apparatus.

According to the present invention, the foregoing object is attained by providing a numerical control system in which an automatically programmable NC apparatus is divided into a number of modules for automatic programming function, NC function, display function, data input/output function, and manual operation function. The system is designed module by module, and the modules are appropriately combined to construct the final system. The system includes a single operator's panel, display device and data input/output unit, these being shared by both an automatic programming unit and a numerical control unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3 through 6(F) are views presented on the screen of a display device and are useful in explaining automatic programming processing.

DESCRIPTION OF THE PREFERRED EMBODIMENT

Figure 1:
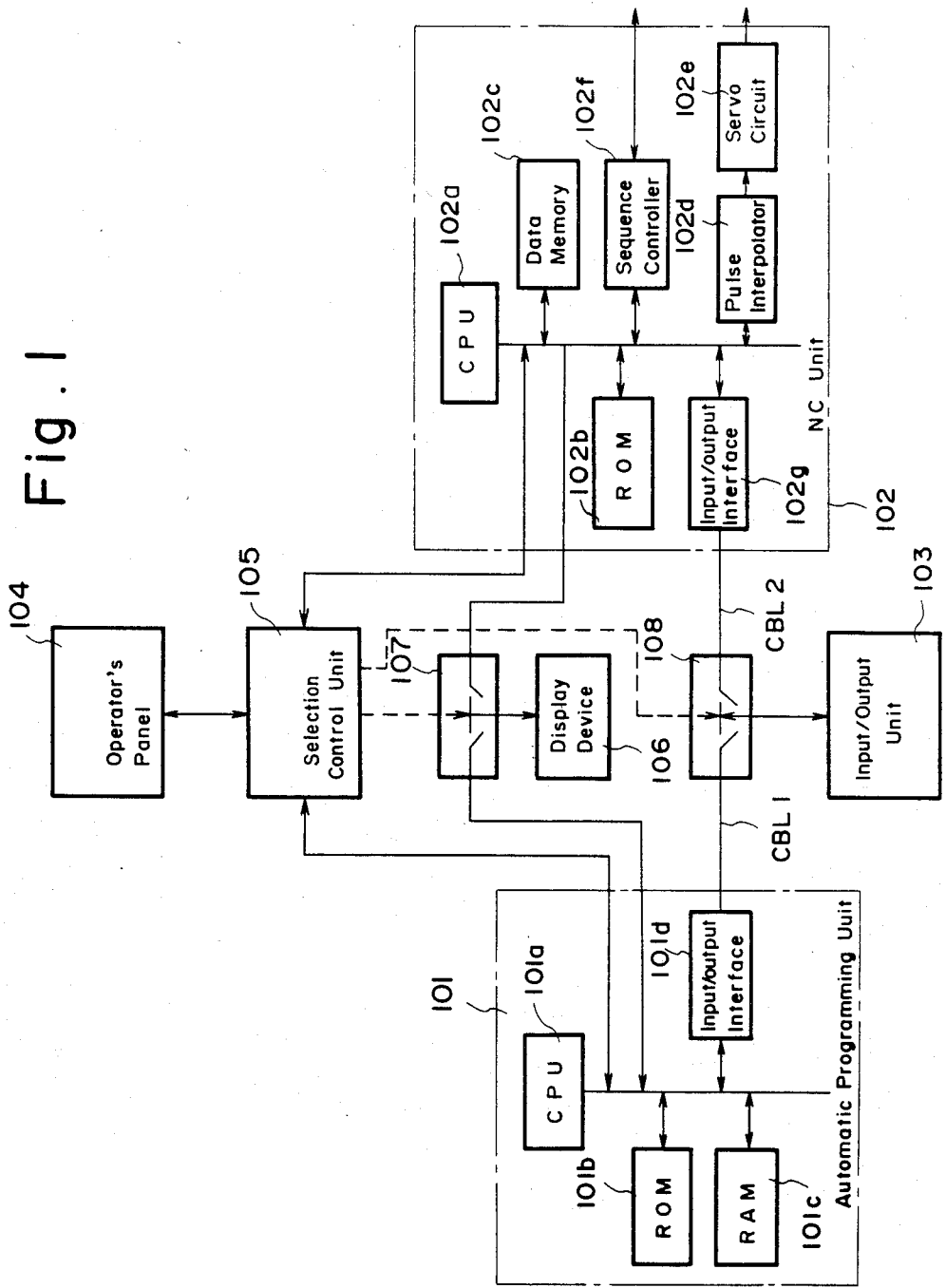
FIG. 1 is a block diagram illustrating an embodiment of a numerical control system according to the present invention.

Reference will now be made to FIG. 1 illustrating a numerical control system according to the invention. The system includes an automatic programming unit 101 which includes a microprocessor 101a which executes processing for, e.g., the creation of NC machining data, a read-only memory (ROM) 101b storing a control program for the creation of NC machining data for the editing of display data, a random-access memory (RAM) 101c for storing a created machining program, and an input/output interface 101d for administering the exchange of data with an NC unit 102 and data input/output unit 103, described below. The NC unit 102 comprises a microprocessor 102a for executing numerical control based on the NC machining data and control program, a read-only memory (ROM) 102b for storing the control program, a data memory 102c for storing the results of numerical control processing as well as NC machining data received from the automatic programming unit 101 and data input/output unit 103, a pulse interpolator 102d for executing known pulse interpolation computations based on a position command and feed speed applied as inputs thereto, a servo circuit 102e for driving and controlling the motors for the respective axes of a machine tool, a sequence controller or magnetics circuit 102f which, when M, S and T function instructions are read from the NC machining data, sends the corresponding commands to the machine tool (not shown), and which delivers to the processor 102a signals received from the relay contacts and limit switches of the machine tool, and an input/output interface 102g.

Figure 2:
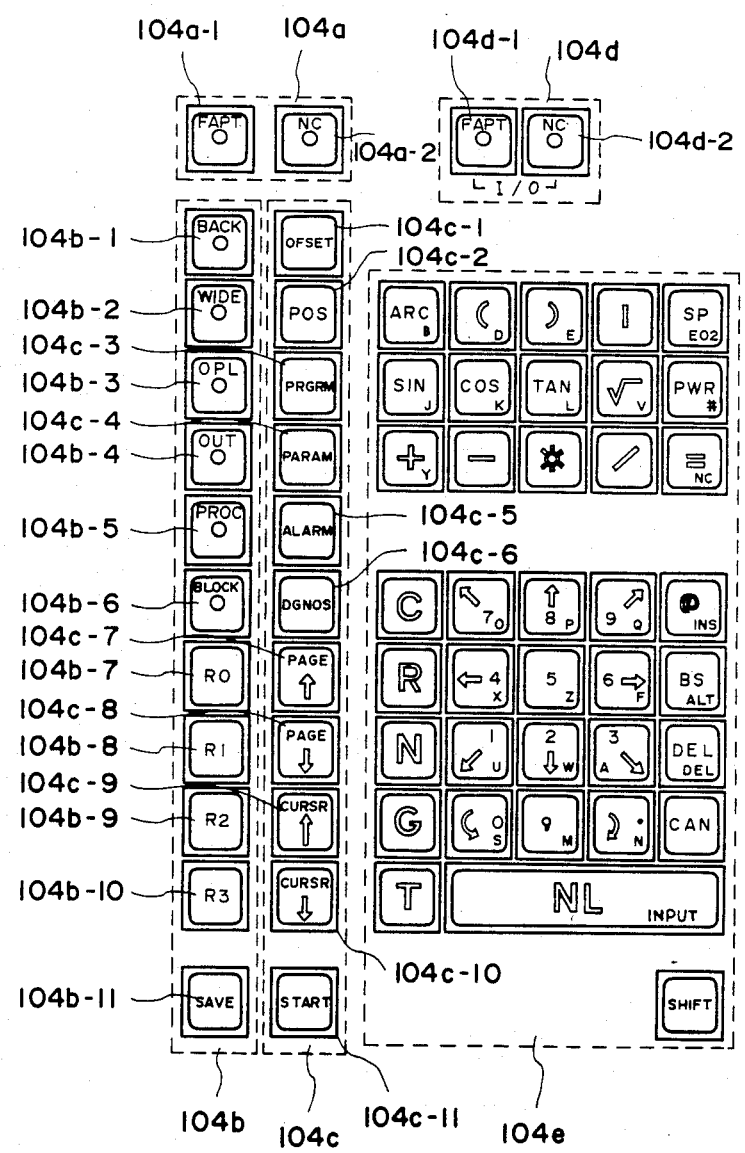
FIG. 2 is a plan view of an operator's panel according to the present invention.

An operator's panel 104 includes a multiplicity of keys, as illustrated in FIG. 2, and is used for both automatic programming and NC control. The keys may be classified generally as follows: (a) a selection key group 104a for selecting whether the operator's panel 104 is to be used for the automatic programming unit 101 (referred to as the FAPT mode) or for the NC unit 102 (referred to as the NC mode), (b) a key group 104b used for the automatic programming unit 101, (c) a key group 104c used for the NC unit 102, (d) an I/O selection key group 104d for selectively connecting the data input/output unit 103 to the automatic programming unit 101 and NC unit 102, and (e) a common data input key group 104e used with both the automatic programming unit 101 and NC unit 102.

The selection key group 104a has a FAPT key 104a-1 and an NC key 104a-2, both of which are provided with lamps. Pressing the FAPT key 104a-1 establishes the FAPT mode so that the operator's panel 104 will operate in conjunction with the automatic programming unit 101. In the FAPT mode, therefore, operating the key group 104c will have no effect on operation, and the data input key group 104e for common use will work for the automatic programming unit. On the other hand, pressing the NC key 104a-2 establishes the NC mode, allowing the operator's panel 104 to work in association with the NC unit 102. Now the key group 104b will be ineffective even if these keys are pressed, and the data input key group 104e will operate in conjunction with the NC unit 102.

The key group 104b for the automatic programming unit 101 includes state setting keys 104b-1 through 104b-6 for setting a variety of states in automatic programming, work designating keys 104b-7 through 104b-10, and a transfer key 104b-11 for transferring NC machining data from the automatic programming unit 101 to the NC unit 102. Examples of the state setting keys are a BACK key (104b-1) for returning a cursor when a data input is made, and a WIDE key (104b-2) for expanding the display. Among the work designating keys, the key 104b-7 marked RO is for designating the start of automatic programming.

The key group 104c for the NC unit 102 includes a variety of function keys 104c-1 through 104c-6, keys 104c-7, 104c-8 for changing the page of a drawing, keys 104c-9, 104c-10 for moving a cursor, and a start key 104c-11 for starting an MDI (manual data input) operation. With regard to the function keys, an OFSET key 104c-1 is used to display and set an offset quantity, a POS key 104d-2 is used to display present position, a PRGRM key 104c-3 is employed to display the contents of a program or the block currently being executed as well as the next block, a PARAM key 104c-4 finds use in displaying and setting parameters, and an ALARM key 104c-5 used to display the contents of an alarm.

The I/O selection key group 104d, which is effective in both the FAPT and NC modes, includes a FAPT key 104d-1 for connecting the data input/output unit 103 to the automatic programming unit 101, and an NC key 104d-2 for connecting the data input/output unit 103 to the NC unit 102. The keys in the data input key group 104e are for entering various items of data which differ depending upon whether the operating mode is the FAPT mode or NC mode, and depending upon the state established in that mode.

Returning to FIG. 1, a selection control unit 105 comprising a microcomputer responds to information received from the operator's panel 104 by (a) sending information from the operator's panel 104 to the automatic programming unit 101 or NC unit 102, (b) connecting the data input/output unit 103 to the automatic programming unit 101 or NC unit 102, (c) interconnecting the automatic programming unit 101 and NC unit 102, and (d) connecting a display device 106 to the automatic programming unit 101 or NC unit 102. More specifically, when the FAPT mode is selected by pressing the FAPT key 104a-1 on the operator's panel 104, the selection control unit 105 sends this information, which is received from the operator's panel 104, to the automatic programming unit 101 and connects the display device 106 to the automatic programming unit 101 through a first switch 107. This makes automatic programming possible. On the other hand, when the NC mode is selected by pressing the NC key 104a-2 on the operator's panel 104, the selection control unit 105 sends this information from the operator's panel 104 to the automatic programming unit 101 and connects the display device 106 to the NC unit 102 through the first switch 107. When the FAPT key 104d-1 in the I/O key group on the operator's panel 104 is pressed, the selection control unit 105 connects the data input/output unit 103 to the automatic programming unit 101 through a second switch 108. Pressing the NC key 104d-2 in the I/O key group connects the data input/output unit 103 to the NC unit 102 through the second switch 108. The selection control unit 105 is further adapted to perform a transfer operation. Specifically, when NC machining data are created in the FAPT mode and the data are ready to be transferred to the NC unit 102, the automatic programming unit 101 produces a signal indicating that the preparations for the transfer are complete. This signal is sent to the selection control unit 105, enabling a meaningful signal to be produced by operation of the transfer key 104b-11. When the transfer key 104b-11 is pressed under these conditions, the selection control unit 105 sends a signal to the NC unit 102 to place the NC unit in an NC machining data reception state, and interconnects the automatic programming unit 101 and the NC unit 102 through the second switch 108. When the control unit 105 communicates that the automatic programming unit 101 of the fact that the NC unit 102 has been placed in the reception state, the automatic programming unit 101 accesses the RAM 101c, which stores previously created NC machining data, and transfers the data block by block to the data memory 102c of the NC unit 102 through the input/output interface 101d, cable CBL1, second switch 108, cable CBL2 and input/output interface 102g. It should be noted that an EOB (end of block) code will be located at the end of the NC machining data. Therefore, when the NC unit 102 senses the EOB code, it will recognize that all of the NC machining data have been received.

The operation of the present invention will now be described.

(A) Automatic programming processing

When the FAPT key 104a-1 on the operator's panel 104 is pressed, the FAPT mode is established to make automatic programming possible. In other words, pressing the above key devotes the operator's panel 104 and display device 106 exclusively to the automatic programming unit 101. In the FAPT mode, the NC unit 102 is capable of executing numerical control processing on the basis of the NC machining data stored in the data memory 102c.

Figure 3:
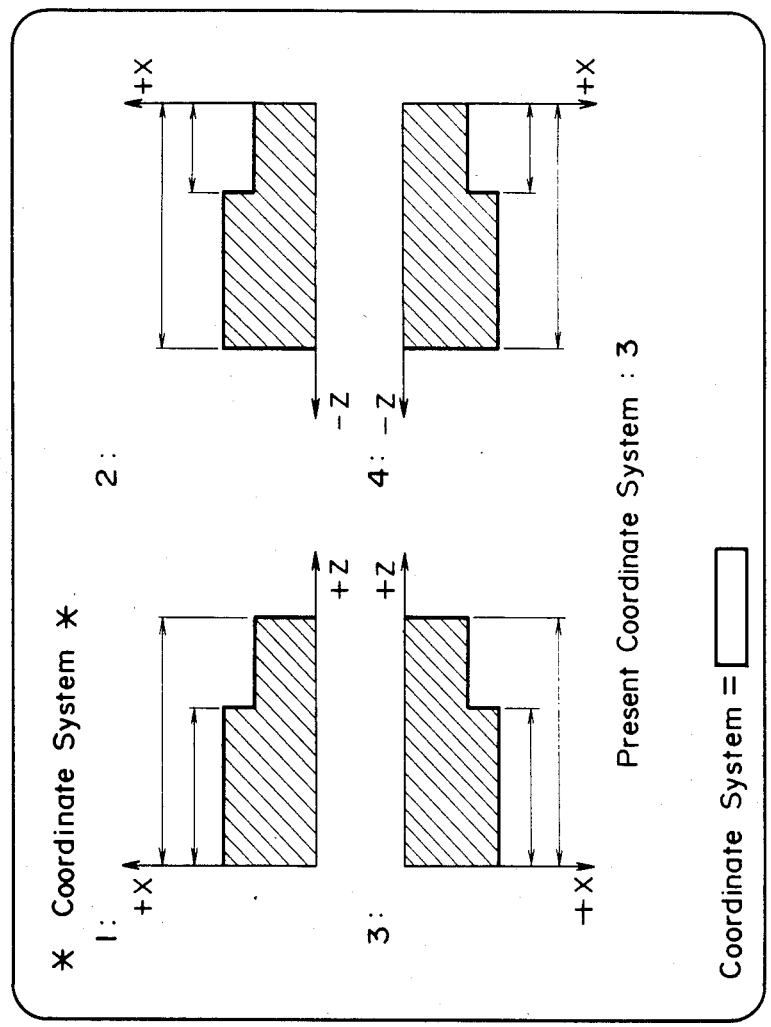

In the FAPT mode, the RO key 104b-7 (FIG. 2) is pressed to start the automatic programming operation. When this is done, the display device 106 presents the display shown in FIG. 3, allowing the operator to select the desired coordinate system. For a turning machining operation, a design drawing will be expressed in one of four coordinate systems, these pertaining to first, second, third and fourth quadrants. The screen of the display device 106 displays each one of these coordinate systems, as well as the numbers 1, 2, 3 and 4 representing the corresponding quadrants. Whichever of the coordinate system numbers 1, 2, 3, 4 has been preset as an initial value will appear after the message reading "PRESENT COORDINATE SYSTEM:". The lowermost part of the display screen is provided with an input information display area bearing the message: "COORDINATE SYSTEM =", indicating that the apparatus is awaiting an operator input. The operator responds by using the data input key group 104e (FIG. 2) to enter the numerical value corresponding to the quadrant in which the part on the blueprint is expressed. When the coordinate system has been selected in this manner, the number of the selected coordinate system appears after the message "PRESENT COORDINATE SYSTEM:".

Figure 5:
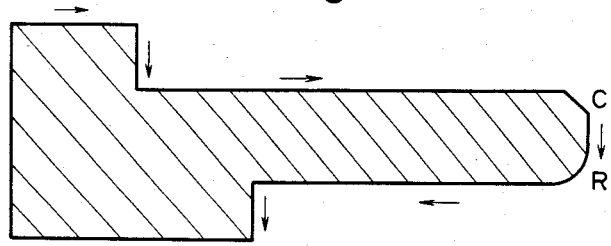
Figure 6:
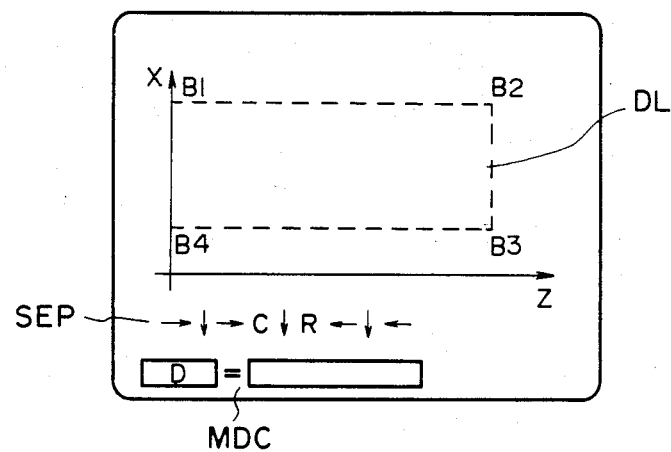
Figure 6:
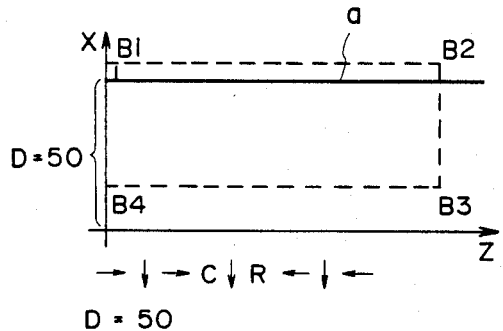
Figure 6:
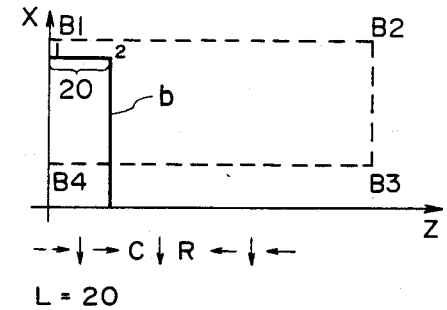
Figure 6:
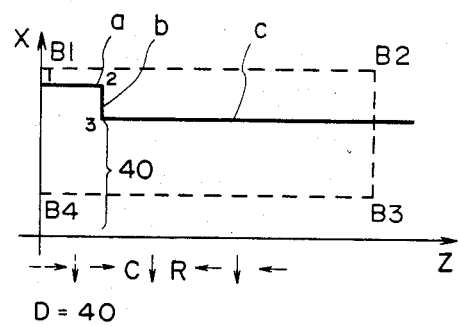
Figure 6:
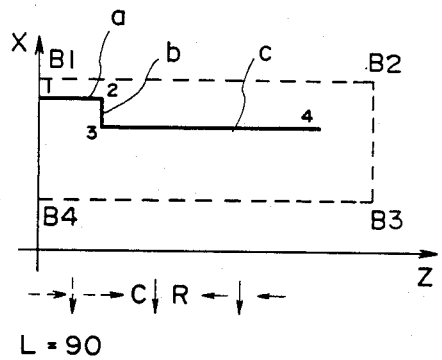
Figure 6:
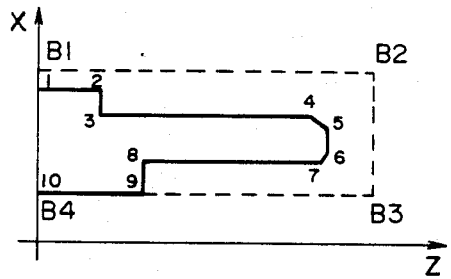

After all the information necessary for coordinate system selection has been entered, the graphic display screen of the display device 106 presents a display of a part contour expressed in terms of shape element symbols that have already been registered in memory. More specifically, as shown in FIG. 4, the display device displays correspondence between a code number and a part contour expressed as a plurality of shape element symbols. The operator views this information to search for the part contour representing the desired graphic. By way of example, if it is desired to create NC machining data for a part contour (FIG. 5) corresponding to a part code 001, then the operator enters the part code 001 using the data input key group 104e. This will cause the graphic and the shape element symbols to appear on the display device 106, as shown in FIG. 6(A). In FIG. 6, the dashed line DL indicates contour of the starting stock. The shape element symbol group SEP expresses the contour shown in FIG. 5.

The next task for the operator is to enter dimensions that specify tool movement. The dimensions are entered in order, starting from the shape element at the far left of the shape element symbol group SEP. As the required dimensions are entered by the operator, these are decoded by the apparatus, which then displays the machining contour on the CRT screen in sequential fashion. For example, with regard to the shape element symbol → displayed at the far left of the shape element symbol group SEP in FIG. 6(A), the display area MDC prompts the operator with "D=", in response to which "D=50" is entered. When this is done, a straight line a at X=50 is immediately displayed on the display screen [FIG. 6(B)], with a serial number "1" appearing at the starting point. This serial number is used later for the purpose of indicating a particular point on the machining contour. Next, the display shifts to an inquiry regarding the length of the drawn straight line a, at which time the display area MDC prompts the operator with "L=". The operator responds by entering the value of the indicated dimension. For example, when "20" is keyed in from the data input key group 104e, the line a is formed into a line segment corresponding to the length 20, with a serial number 2 appearing at the end point of the line. This ends the processing for the entry of the dimension relating to the first shape element symbol →, causing the symbol → at the far left of the shape element symbol group to vanish from the screen. Processing for the next shape element symbol ↓ now takes place. Specifically, the shape to be processed next is given by ↓, which information causes a straight line b to be drawn on the display screen vertically downwardly from the serial number 2, as shown in FIG. 6(C). The operator, in response to a prompt "D=" regarding the length of the drawn straight line b, enters the dimensional value using the data input key group 104e. For example, when the operator keys in "40", the line b is transformed into a line segment where the diameter at the end point corresponds to "40", as depicted in FIG. 6(D), with a serial number 3 appearing at the end point. The foregoing operation ends processing for the entry of the dimension relating to the shape element symbol ↓, with the shape element symbol ↓ vanishing from the display screen. Next, in response to information "→" for the shape element symbol to be processed subsequently, a straight line c is drawn to the right from the end point of the line segment b, as illustrated in FIG. 6(D), and operations similar to those described heretofore are performed in such fashion as to set the length of a line segment c, as shown in FIG. 6(E). These operations are repeated until the entry of part dimensions for describing the contour shown in FIG. 6(F) are completed. The input coordinate system, part contour and dimensions are converted into numerical control information, which is then loaded in the RAM 101c to end processing for the creation of the numerical control data.

It should be noted that when an entirely new program is to be created, that is, when an already registered, utilizable program does not exist, the new program is created from the very beginning in the above-described manner using the shape symbols. However, in ordinary program creation, a utilizable program that is already registered is used as a starting point. In such a case, when the program is called to the display screen, the shape symbols are displayed together with the program. Then, using these shape symbols, the operator partially modifies the program to create the desired program.

(B) NC processing

When the operator presses the NC key 104a2 on the operator's panel 104, the NC mode is established, so that the operator's panel 104 and display device 106 function as a manual data input unit (MDI) having a CRT. This makes it possible to perform the processing executed heretofore by an MDI unit, namely an MDI operation, NC data modification, offset quantity display and setting, program content display, parameter display and setting, present position display and resetting, alarm content display, etc.

(C) NC machining data transfer processing

When NC machining data have been created by the processing indicated in (A), the automatic programming unit 101 provides the selection control unit 105 with a signal indicating that the preparations for data transfer are complete. If the operator now presses the transfer key 104b-11 on the operator's panel 104, then the selection control unit 105 will recognize the above-mentioned signal and, in response, will interconnect the automatic programming unit 101 and the NC unit 102 through the second switch 108, and place the NC unit 102 in the reception state, enabling it to receive the NC machining data. When the NC unit 102 has been placed in this state, the selection control unit 105 instructs the automatic programming unit 101 to start transmitting the NC machining data. In response, the automatic programming unit 101 accesses the RAM 101c, which stores the created NC machining data, and transfers the data to the NC unit 102 one block at a time, either serially or in parallel, through the input/output interface 101d, cable CBL1, second switch 108, cable CBL2 and input/output interface 102g. The microprocessor 102a in the NC unit 102 reads the NC command data out of a buffer register in the input/output interface 102g, plants the data in the data memory 102c, and determines whether an EOB (end of block) code is present. Thereafter, through the action of the microprocessors 101a and 102a in the automatic programming unit 101 and NC unit 102, respectively, the NC machining data are successively transferred from the RAM 101c to the data memory 102c via the route described above, with the transfer processing coming to an end when an EOB code is detected. It should be noted that when the NC unit 102 is executing NC processing based on the NC machining data stored in the data memory 102c, the NC unit will ignore any operation of the transfer key 104b-11. An arrangement is possible, however, wherein an interrupt is applied to the NC unit in such case. In such an arrangement, the interrupt will place the NC unit 102 in the reception state, with NC processing being resumed after the NC data have been received.

(D) Machining control processing

When NC machining data have been stored in the data memory 102c, the NC unit 102 becomes capable of executing numerical control processing (machining control). With the NC unit 102 in this condition, the operator goes to a panel located near the machine tool (not shown) and, using the panel, places a mode selection switch in a memory run mode position and presses a cycle start button. This causes the microprocessor 102a to read NC machining data out of the data memory 102c in successive fashion, whereby the machine tool is made to perform an NC machining operation under the control of the control program. While the machining control processing is being executed, the operator may press the FAPT key 104a-1 on the operator's panel 104 to establish the FAPT mode, so that automatic programming processing can be carried out at the same time.

(E) Input/output control processing

When the operator presses the FAPT key 104d-1 in the I/O selection key group 104d disposed on the operator's panel 104, the data input/output unit 103, under the control of the selection control unit 105, is connected to the automatic programming unit 101 through the switch 108. The NC machining data stored in the RAM 101c is fed into the data input/output unit 103, in accordance with the input/output program of the automatic programming unit 101, through the input/output interface 101d, cable CBL1 and second switch 108. The input/output unit 103, such as a floppy disk unit, data reader/puncher or magnetic tape cassette unit, preserves the data on the particular storage medium. When the operator presses the NC key 104d-2 in the I/O selection key group 104d disposed on the operator's panel 104, the data input/output unit 103, under the control of the selection control unit 105, is connected to the NC unit 102 through the switch 108. The NC machining data, which are preserved on, say, a floppy disk, paper tape or NC tape in the data input/output unit 103, are transferred to the data memory 102c, under the control of the microprocessor 102a, in the second switch 108, cable CBL2 and input/output interface 102g.

When the automatic programming unit 101 is connected to the data input/output unit 103 and the input and output of data are being carried out under the control of the microprocessor 101a, the NC unit 102 can perform machining control independently based on the NC machining data stored in the data memory 102c. When the NC unit 102 is connected to the data input/output unit 103 and the input and output of data are being carried out under the control of the microprocessor 102a, the automatic programming unit 101 is capable of performing automatic processing in the FAPT mode.

(F) Display control

Figure 7:
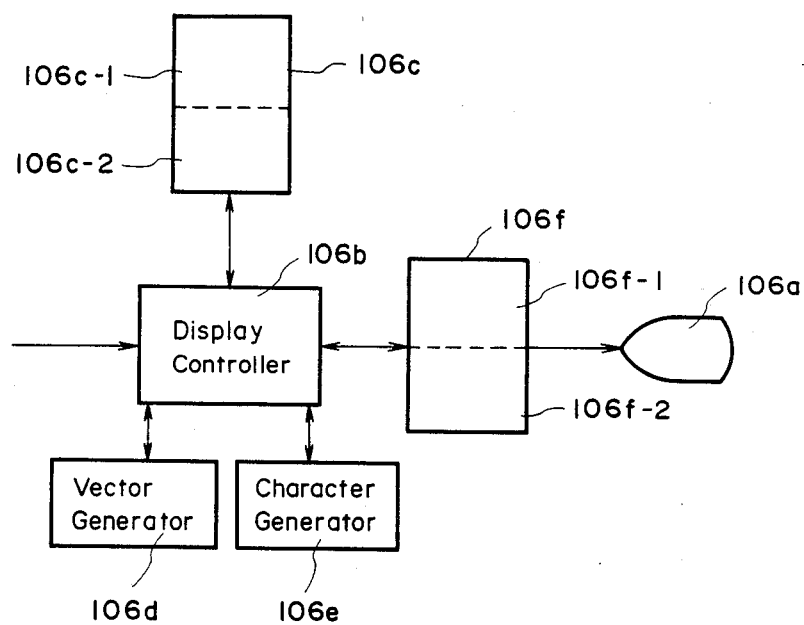
FIG. 7 is a block diagram of a display device included in the system of FIG. 1.

When the operator presses the FAPT key 104a-1 on the operator's panel 104, the FAPT mode is established to enable automatic programming processing, and the display device 106 is devoted to the automatic programming unit 101. The latter immediately delivers the first item of picture data to the display device 106, the construction of which is shown in FIG. 7. The data is stored in a first storage area 106c-1 of a refresh memory 106c through a display controller 106b. The display controller 106b subsequently reads the data out of the first storage area 106c-1 and, using a vector generator 106d and character generator 106e, generates a picture in accordance with the data. The picture is stored in a first storage area 106f-1 of a picture memory 106f. Thereafter, the picture stored in the first storage area 106f-1 of the picture memory 106f is displayed on a CRT 106a by raster scanning. From this point onward the displayed picture changes based on the progress of the automatic programming operation.

When the operator presses the NC key 104a-2 on the operator's panel 104, the NC mode is established to enable NC processing, and the display device 106 is devoted to the NC unit 102. Subsequently pressing the function keys 104c-1 through 104c-6 on the operator's panel 104 causes the NC unit 102 to deliver picture data, conforming to the function key pressed, to a second storage area 106c-2 in the refresh memory 106c, where the data are then stored. Next, the display controller 106b reads the data out of the second storage area 106c-2, generates a picture and stores the picture in a second storage area 106f-2 of the picture memory 106f. Thereafter, the picture stored in the second storage area 106f-2 is displayed on the CRT 106a by raster scanning.

In the case described above, picture data are created by the automatic programming unit 101 and NC unit 102 and sent to the display device 106. However, an arrangement is possible wherein the display device 106 is provided with an editing function, with the picture data being created and displayed by the display device 106 in accordance with the FAPT mode or NC mode, and based on data entered by the operator's panel.

As described above, the picture memory 106f is provided with first and second storage areas for use with unit 101 and unit 102. Accordingly, even if a changeover is made from the FAPT mode, during the course of automatic programming while the display device is displaying the relevant information, to the NC mode so that the operator may perform an operation such as displaying and modifying an offset quantity, followed by restoring the FAPT mode, the previous picture displayed in the FAPT mode prior to the changeover will reappear on the display screen. Likewise, when the FAPT mode is switched to and an operation performed while a picture is being displayed on the display device 106 in the NC mode, the picture will reappear when the NC mode is restored.

Therefore, according to the present invention, various functions are separated into individual modules, each of which is designed independently, and the modules are combined into a system. This appoach facilitates design and maintenance. Furthermore, only one operator's panel, display device and data input/output unit need be provided, these being shared by both the automatic programming unit and NC unit. This not only reduces the cost and size of the system but also facilitates operability because the operator can make the necessary inputs at one station.

In the illustrated embodiment, the automatic programming unit and NC unit share rise of the operator's panel, display device and data input/output unit. However, a modification is possible wherein only the operator's panel is so shared.

As many apparently widely different embodiments of the present invention can be made without departing from the spirit and scope thereof, it is to be understood that the invention is not limited to the specific embodiments thereof except as defined in the appended claims.

What we claim is:

1. A numerical control system having an automatic programming unit for executing automatic programming, and a numerical control unit for executing numerical control, comprising:
    an operator's panel, for the automatic programming unit and the numerical control unit, for inputting selection information indicating one of an automatic programming mode and a numerical control mode and for inputting input/output selection information;
    an input/output unit for the automatic programming unit and the numerical control unit, for inputting and outputting a numerical control program; and
    a selection control unit, operatively connected to said operator's panel, said input/output unit, the automatic programming unit and the numerical control unit, for selectively connecting said operator's panel to one of the automatic programming unit and the numerical control unit in dependence upon the selection information indicating the one of the automatic programming mode and the numerical control mode, and for selectively connecting said input/output unit to one of the automatic programming unit and the numerical control unit based on the input/output selection information indicating the one of the automatic programming and the numerical control units with which said input/output unit is to be operatively connected.

2. A numerical control system according to claim 1, wherein said operator's panel comprises:
    a mode selection key, operatively connected to said selection control unit, for generating the sclection information indicating the one of the automatic programming mode and the numerical control mode; and
    an input/output selection key, operatively connected to said selection control unit, for generating the input/output selection information.

3. A numerical control system according to claim 2, wherein said selection control unit comprises means, operatively connected to said input/output unit, the automatic programming unit and the numerical control unit, for selecting the numerical control mode in which the numerical control can be performed simultaneously with the input/output operation between the automatic programming unit and said input/output unit.

4. A numerical control system according to claim 2, wherein said selection control unit comprises means, operatively connected to said input/output unit, for selecting the automatic programming mode in which the automatic programming can be executed by the automatic programming unit simultaneously with the input/output operation between the numerical control unit and said input/output unit.

5. A numerical control system according to claim 1, wherein said selection control unit comprises means, operatively connected to said input/output unit, the automatic programming unit and the numerical control unit, for selecting the numerical control mode in which the numerical control can be performed simultaneously with the input/output operation between the automatic programming unit and said input/output unit.

6. A numerical control system according to claim 1, wherein said selection control unit comprises means, operatively connected to said input/output unit, the automatic programming unit and the numerical control unit, for selecting the automatic programming mode in which the automatic programming can be executed by the automatic programming unit simultaneously with the input/output operation between the numerical control unit and said input/output unit.

7. A numerical control system having an automatic programming unit for executing automatic programming and a numerical control unit for executing numerical control, comprising:
    an operator's panel, for the automatic programming unit and the numerical control unit, for inputting first selection information indicating one of an automatic programming mode and a numerical control mode and for inputting second selection information;
    a display device for the automatic programming unit and the numerical control unit;
    an input/output unit for inputting a first numerical control program to one of the automatic programming unit and the numerical control unit and outputting a second numerical control program from the automatic programming unit; and
    a selection control unit, operatively connected to said operator's panel, said display device, said input/output unit, the automatic programming unit and the numerical control unit, for selectively connecting said operator's panel and said display device to the automatic programming unit and the numerical control unit in dependence upon the first selection information indicating the one of the automatic programming mode and the numerical control mode and for selectively connecting said input/output unit to one of the automatic programming unit and the numerical control unit based ontthe second selection information indicating the one of the automatic programming unit and the numerical control unit with which said input/output unit is to be operatively connected.

8. A numerical control system according to claim 7, wherein said operator's panel includes a selection key, operatively connected to said selection control unit, for producing the first selection information.

9. A numerical control system according to claim 8, wherein said operator's panel includes a first key group, operatively connected to said selection control unit, for use with said automatic programming unit, a second key group, operatively connected to said selection control unit, for use with the numerical control unit, and a data input key group, operatively to said selection control unit, for use with both the automatic programming unit and the numerical control unit, and
    wherein said selection control unit comprises means, operatively connected to the first, a second said data key groups, the automatic programming unit and the numerical control unit, for rendering the second key group inactive and applying first information, entered from the first key group and the data input key group, to the automatic programming unit in the automatic programming mode, and for rendering the first key group inactive and applying second information, entered from the second key group and the data input key group, to the numerical control unit in the numerical control mode.

10. A numerical control system according to claim 7, wherein said operator's panel includes an input/output selection key, operatively connected to said selection control unit, for producing the second selection information.

11. A numerical control system according to claim 10,
wherein said operator's panel includes a first key group, operatively connected to said selection control unit, for use with the automatic programming unit, a second key group, operatively connected to said selection control unit, for use with the numerical control unit, and a data input key group, operatively connected to said selection control input, for use with both the automatic programming unit and the numerical control unit, and
wherein said selection control unit comprises means, operatively connected to the first, second and data key groups, the automatic programming unit and the numerical control unit, for rendering the second key group inactive and applying first information, entered from the first key group and the data input key group, to the automatic programming unit in the automatic programming mode, and for rendering the first key group inactive and applying second information, entered from the second key group and the data input key group, to the numerical control unit in the numerical control mode.

12. A numerical control system having an automatic programming unit for executing automatic programming and a numerical control unit for executing numerical control, comprising:
an operator's panel for inputting first selection information indicating one of an automatic programming mode and a numerical control mode and for inputting second selection information, comprising:

a first key group for use with the automatic programming unit;
a second key group for use with the numerical control unit;
a data input key group for use with the automatic programming unit and the numerical control unit; and
a display device for the automatic programming unit and the numerical control unit;
an input/output unit for the automatic programming unit and the numerical control unit; and
a selection control unit, operatively connected to the first, second and data key groups of said operator's panel, said display device, said input/output unit, the automatic programming unit and the numerical control unit, for selectively connecting said operator's panel and said display device to the automatic programming unit and the numerical control unit in dependence upon the first selection information indicating the one of the automatic programming mode and the numerical control mode and for selectively connecting said input/output unit to one of the automatic programming unit and the numerical control unit based on the second selection information indicating the one of the automatic programming unit and the numerical control unit with which said input/output unit is to be operatively connected and for rendering the second key group in active and applying first information, entered from the first key group and the data input key group, to the automatic programming unit in the automatic programming mode, and for rendering the first key group inactive and applying second information, entered from the second key group and the data input key group, to the numerical control unit in the numerical control mode.

13. A numerical control system according to claim 12, wherein said operator's panel further comprises a selection key, operatively connected to said selection control unit, for producing the first selection information.

14. A numerical control system according to claim 12, wherein said operator's panel further comprises an input/output selection key, operatively connected to the selection control unit, for producing the second selection information.

* * * * *

UNITED STATES PATENT AND TRADEMARK OFFICE
CERTIFICATE OF CORRECTION

PATENT NO. : 4,607,327
DATED : August 19, 1986
INVENTOR(S) : Kishi et al.

It is certified that error appears in the above-identified patent and that said Letters Patent is hereby corrected as shown below:

Col. 7, line 57, "in" should be --via--.
Col. 9, line 4, "rise" should be --use--;
        line 46, "sclection" should be --selection--.
Col. 10, line 46, "ontthe" should be --on the--;
        line 62, after "tively" insert --connected--;
        line 66, delete "a"; "said" should be --and--.
Col. 12, line 29, "in active" should be --inactive--.

Signed and Sealed this

Sixth Day of January, 1987

Attest:

DONALD J. QUIGG

Attesting Officer

Commissioner of Patents and Trademarks